United States Patent
Gore et al.

(10) Patent No.: US 11,386,341 B1
(45) Date of Patent: Jul. 12, 2022

(54) INFERRING A REACH OF A CONTENT ITEM PRESENTED TO INDIVIDUALS BY ONE OR MORE CONTENT PUBLISHERS FOR A SET OF IMPRESSION FREQUENCIES

(71) Applicant: Meta Platforms, Inc., Menlo Park, CA (US)

(72) Inventors: Logan Michael Gore, Seattle, WA (US); Xiao Zhang, Redmond, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 983 days.

(21) Appl. No.: 15/919,958

(22) Filed: Mar. 13, 2018

(51) Int. Cl.
 *G06N 5/04* (2006.01)
 *G06N 20/00* (2019.01)

(52) U.S. Cl.
 CPC ............. *G06N 5/046* (2013.01); *G06N 20/00* (2019.01)

(58) Field of Classification Search
 CPC .............................. G06N 5/046; G06N 20/00
 See application file for complete search history.

(56) References Cited

U.S. PATENT DOCUMENTS

| | | | |
|---|---|---|---|
| 10,324,960 B1 * | 6/2019 | Skvortsov | G06Q 30/0277 |
| 2018/0165697 A1 * | 6/2018 | Stolorz | G06Q 30/0269 |

OTHER PUBLICATIONS

Cheng, "Personalized Click Prediction in Sponsored Search", 2010 (Year: 2010).*
Lee, "The Effect of Advertising Content on Consumer Engagement: Evidence from Facebook", 2013 (Year: 2013).*
Shuai Yuan, "Real-time bidding for online advertising: measurement and analysis", 2013 (Year: 2013).*
Sergie Izrailev, "Machine Learning at Scale", 2014 (Year: 2014).*
Ling, "Model Ensemble for Click Prediction in Bing Search Ads", Microsoft research, 2017 (Year: 2017).*
Paul Barford "Adscape: Harvesting and Analyzing Online Display Ads", 2014 (Year: 2014).*

* cited by examiner

*Primary Examiner* — Ann J Lo
*Assistant Examiner* — Van C Mang
(74) *Attorney, Agent, or Firm* — Fenwick & West LLP

(57) ABSTRACT

An online system receives information describing presentations of a content item to individuals. The online system determines impression frequencies for online system users included among the individuals, de-biases this information, and trains a set of machine-learning models to infer a reach for each of multiple impression frequencies using the de-biased information. The online system predicts the reach for each impression frequency using the models, determines an inferred total number of presentations of the content item based on the inferences, and compares the inferred total number of presentations to a known total number of presentations of the content item. If the inferred total number of presentations is greater than the known total number of presentations, the online system adjusts the inferred reach for a set of impression frequencies by reducing the inferred reach for a highest impression frequency and by increasing the inferred reach for one or more lower impression frequencies.

26 Claims, 5 Drawing Sheets

INFERRING A REACH OF A CONTENT ITEM PRESENTED TO INDIVIDUALS BY ONE OR MORE CONTENT PUBLISHERS FOR A SET OF IMPRESSION FREQUENCIES

BACKGROUND

This disclosure relates generally to online systems, and more specifically to inferring a reach of a content item presented to individuals by one or more content publishers for a set of impression frequencies.

An online system allows its users to connect and communicate with other online system users. Users create profiles in the online system that are tied to their identities and include information about the users, such as interests and demographic information. The users may be individuals or entities such as corporations or charities. Because of the popularity of online systems and the significant amount of user-specific information maintained in online systems, an online system provides an ideal forum for allowing users to share content by creating content items for presentation to additional online system users. For example, users may share photos or videos they have uploaded by creating content items that include the photos or videos that are presented to additional users to whom they are connected in the online system. An online system also provides advertisers with abundant opportunities to increase awareness about their products or services by presenting advertisements to online system users. For example, advertisements presented to users allow an advertiser to gain public attention for products or services and to persuade online system users to take an action regarding the advertiser's products, services, opinions, or causes.

To encourage online system users (e.g., advertisers) to provide content items (e.g., advertisements) for presentation to other online system users, online systems often provide such content-providing users with analytics describing the performance of their content items that would allow them to better tailor their content items to target audiences within the online system. For example, an online system may track presentations of a content item to online system users during a specific time period and purchases made by the users at a website to which the content item is linked and generate analytics for the content item. In this example, the analytics may describe a number of the users who were presented with the content item (i.e., a "reach" of the content item) and a percentage of those users who made a purchase at the website to which the content item is linked. Furthermore, in this example, the analytics may break down the reach by impression frequency (i.e., the number of times the content item was presented to the same user), such that the analytics may describe the number or the percentage of users who were presented with the content item once, twice, etc. and the percentage of those users who made a purchase at the website.

To further encourage content-providing users to provide content items for presentation to other online system users, online systems may offer to provide the content items to content publishers. For example, an online system may offer to provide a content item received from a content-providing user to multiple content publishers that each may present the content item to various individuals. By offering this service, online systems may attract and therefore receive content items from advertisers and other content-providing users who have an interest in having content items presented by multiple content publishers, but who may find it complicated and time-consuming to provide the content items to each content publisher.

However, it may be difficult or impossible for online systems to generate analytics for content items presented by multiple content publishers. The reason for this is that if a content item is presented by multiple content publishers, while some of the content publishers may track various events associated with the content item, other content publishers may not. Therefore, even though content publishers that track events associated with the content item may communicate information describing the events to an online system so that the online system may compile this information and use it to generate analytics for the content item, since some content publishers may not track these events, analytics generated from the compiled information may be inaccurate. Furthermore, some content publishers may not maintain the same amount of user-specific information as the online system, making it difficult for the online system to identify individuals who may have been presented with the same content item across multiple content publishers and to generate analytics based on impression frequency. Thus, content-providing users of an online system may find analytics describing the performance of content items presented by multiple content publishers to be limited in their ability to convey information that would allow the content-providing users to better tailor their content items to target audiences across different content publishers.

SUMMARY

Conventionally, to generate analytics describing presentations of content items by multiple content publishers, online systems rely on the content publishers that present the content items to communicate this information to the online systems. However, content publishers may not track the presentations of the content items and therefore may not communicate information describing the presentations to online systems. Furthermore, even if the content publishers are able to communicate this information to online systems, the content publishers may not maintain sufficient user-specific information that would allow the online systems to identify the individuals to whom the content items have been presented. Without information describing presentations of content items to individuals by multiple content publishers and user-specific information identifying these individuals, online systems are unable to accurately generate analytics for content items presented by multiple content publishers.

Therefore, rather than relying on content publishers to communicate this information, an online system (e.g., an online content distribution system) receives information describing presentations of a content item (i.e., "impressions" of the content item) by multiple content publishers via tracking mechanisms and/or interactive elements that track presentations of the content item by the content publishers. Furthermore, rather than relying on the content publishers to identify individuals to whom the content item was presented, the online system identifies online system users included among individuals presented with the content item based on user-identifying information maintained in the online system and determines impression frequencies for the online system users. The online system then de-biases this information to adjust for differences between the population of online system users and the individuals to whom the content item was presented.

To generate analytics describing impressions of the content item across the content publishers, the online system then trains a set of machine-learning models to infer a reach for each of multiple impression frequencies using the de-biased information. Based on the reach inferred for each impression frequency using the machine-learning models, the online system determines an inferred total number of presentations of the content item and compares the inferred total number of presentations to a known total number of presentations of the content item. If the inferred total number of presentations is greater than the known total number of presentations, the online system adjusts the inferred reach for a set of impression frequencies by reducing the inferred reach for a highest impression frequency and by increasing the inferred reach for one or more lower impression frequencies.

In some embodiments, to adjust the inferred reach for a set of impression frequencies, the online system may use a linear approach that reduces the inferred reach of the content item by a given number of individuals for a highest impression frequency and increases the inferred reach of the content item for the lowest impression frequency by the same number of individuals. In other embodiments, to adjust the inferred reach for a set of impression frequencies, the online system may use an exponential decay approach that reduces the inferred reach of the content item by a given number of individuals for a highest impression frequency and increases the inferred reach of the content item for each of multiple lower impression frequencies by a fraction of the same number of individuals. In embodiments in which the online system uses an exponential decay approach, the fraction of the number of individuals by which the online system increases the inferred reach for an impression frequency may be proportional to the number of impressions corresponding to the impression frequency.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
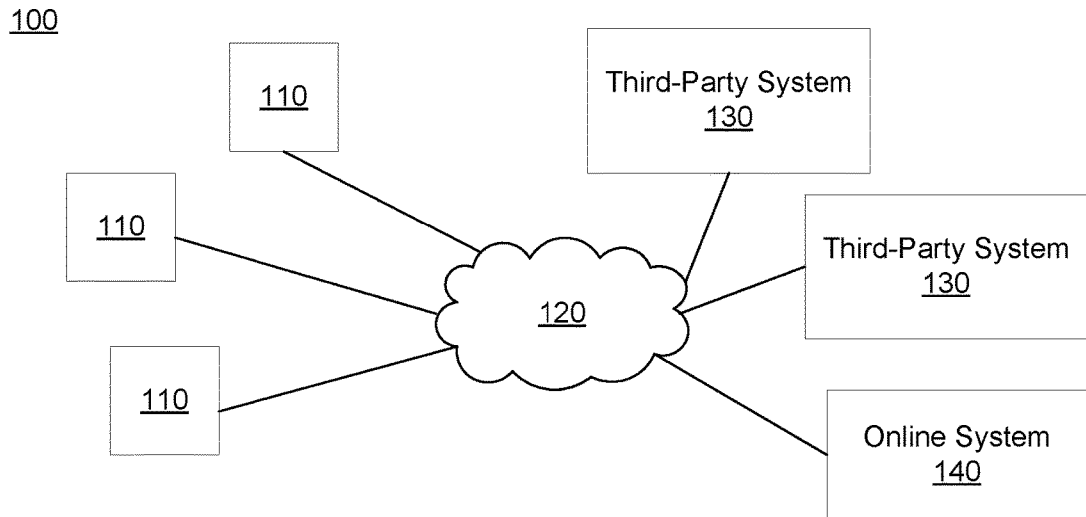
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
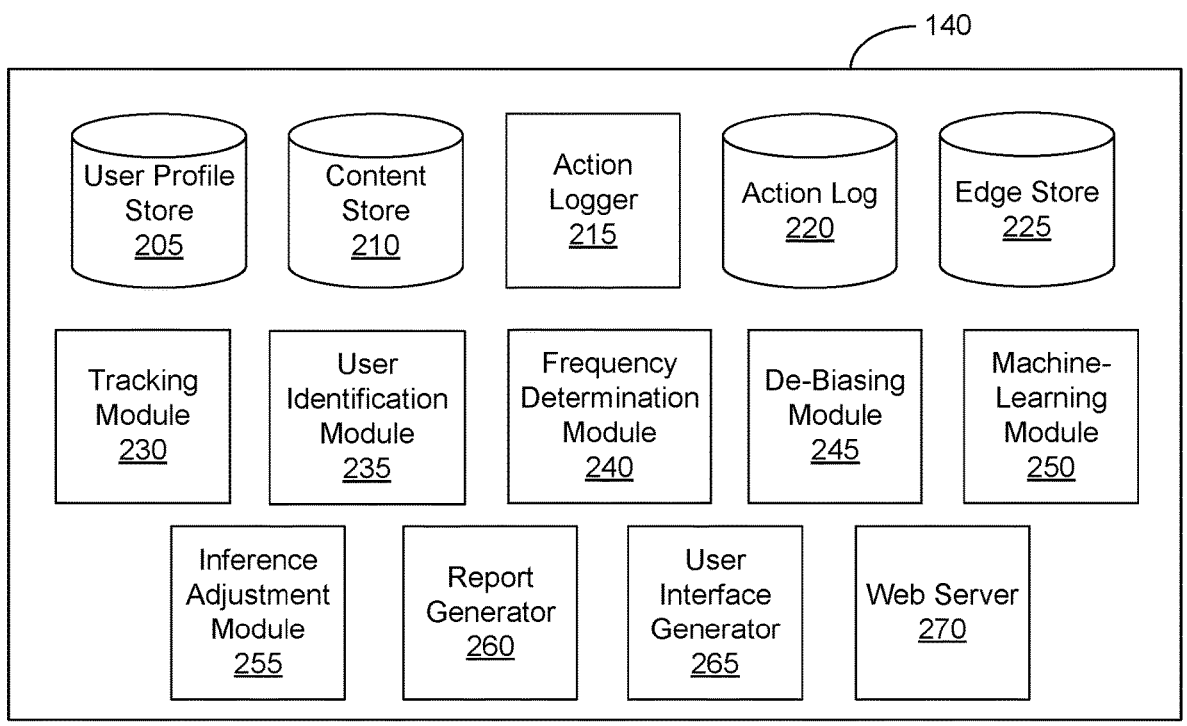
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a tracking module 230, a user identification module 235, a frequency determination module 240, a de-biasing module 245, a machine-learning module 250, an inference adjustment module 255, a report generator 260, a user interface generator 265, and a web server 270. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more user attributes for the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image. A user profile in the user profile store 205 also may maintain references to actions by the corresponding user performed on content items in the content store 210 and stored in the action log 220.

In some embodiments, the user profile store 205 stores user-identifying information for users of the online system 140. User-identifying information for an online system user may include personally-identifiable information. Examples of personally-identifiable information include a full name, a home address, a phone number, an email address, a user identifier that is unique to the user in the online system 140 or in a third-party system 130 (e.g., a username, a user identification number, or a cookie identifier), a client device identifier (e.g., an IP address), a browser identifier (e.g., a user agent), etc. In some embodiments, user-identifying information also may include additional types of information that potentially may be combined with other personal information to identify an online system user, such as an age, a gender, a geographic region, etc. For example, user-identifying information for an online system user may include a combination of the user's first name, age, hometown, educational background, and occupation.

In some embodiments, the user profile store 205 also may store (e.g., as shown in step 345 of FIG. 3A) impression frequencies and/or interaction frequencies associated with content items for online system users in conjunction with user profiles of the online system users. An impression frequency associated with a content item describes a number of times that an online system user was presented with the content item within a specified period of time. For example, an impression frequency of four associated with a content item for an online system user indicates that the user was presented with the content item four times within a specified period of time. Similarly, an interaction frequency associated with a content item describes a number of times that an online system user performed an action in association with being presented with the content item within a specified period of time. For example, an interaction frequency of three associated with a content item for an online system user indicates that the online system user performed an action in association with being presented with the content item (e.g., clicking on the content item, making a purchase associated with the content item, etc.) three times within a specified period of time.

While user profiles in the user profile store 205 are frequently associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The content store 210 may store (e.g., as shown in step 305 of FIG. 3A) an object representing a content item received from a content-providing user of the online system 140 in conjunction with various types of information associated with the content item. In some embodiments, the content store 210 may store information identifying one or more third-party systems 130 to which a content item is to be provided. For example, if an advertiser provides a an advertisement to the online system 140 and identifies one or more content publishers to which the advertisement is to be provided, the online system 140 may store information identifying the content publishers in the content store 210 in association with the object representing the advertisement.

The content store 210 also may store (e.g., as shown in step 325 of FIG. 3A) information describing presentations of one or more content items to individuals in association with objects representing the content items (e.g., in one or more tables or logs). Information describing a presentation of a content item may include information identifying a third-party system 130 that presented the content item, information identifying an individual to whom the content item was presented, information describing an action performed by the individual in association with being presented with the content item, a date/time of the presentation/performance of the action, etc. For example, the online system 140 may maintain a table in the content store 210 that is stored in association with an object representing a content item, in which each entry in the table corresponds to information describing a presentation of the content item to an individual. In this example, each column of the table may correspond to a different type of information associated with each presentation of the content item (e.g., information identifying the individual to whom the content item was presented, information identifying a third-party system 130 that presented the content item, a time at which the content item was presented, a type of action that the individual may have performed in association with being presented with the content item, etc.).

In various embodiments, the content store 210 also may store information describing a known total number of presentations of a content item to individuals by one or more third-party systems 130. For example, the online system 140 may maintain an impression count in the content store 210 that is stored in association with an object representing a content item. In this example, the impression count is initialized to a value of zero and is incremented by a value of one each time the online system 140 receives information describing a presentation of the content item to an individual, such that a known total number of presentations of the content item is maintained in the content store 210 and may be retrieved from the content store 210 by accessing the impression count. In some embodiments, the content store 210 also may store information describing a known total number of times an action has been performed by individuals in association with being presented with a content item by one or more third-party systems 130. In the above example, the online system 140 also may maintain an action count in the content store 210 that is stored in association with the object representing the content item. In this example, the action count is initialized to a value of zero and is incremented by a value of one each time the online system 140 receives information describing a type of action performed in association with a presentation of the content item, such that a known total number of times the action has been performed is maintained in the content store 210 and may be retrieved from the content store 210 by accessing the action count.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010 (U.S. Publication No. US 2012/0166532 A1, published on Jun. 28, 2012), U.S. patent application Ser. No. 13/690, 254 (U.S. Pat. No. 9,070,141, issued on Jun. 30, 2015), filed on Nov. 30, 2012, U.S. patent application Ser. No. 13/689, 969, filed on Nov. 30, 2012 (U.S. Pat. No. 9,317,812, issued on Apr. 19, 2016), and U.S. patent application Ser. No. 13/690,088, filed on Nov. 30, 2012 (U.S. Publication No. US 2014/0156360 A1, published on Jun. 5, 2014), each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The tracking module 230 may generate and/or set tracking mechanisms and/or interactive elements used to track presentations of a content item to individuals by third-party systems 130. Examples of tracking mechanisms include tracking pixels and cookies while examples of interactive elements include plug-ins associated with the online system 140 (e.g., buttons with which online system users may interact to indicate a preference for a content item, to comment on the content item, or to share the content item with other users of the online system 140). The tracking mechanisms and/or interactive elements may communicate information to the online system 140 describing each presentation of a content item. For example, the tracking module 230 may generate code corresponding to a tracking pixel that allows information describing a request to present a content item to an individual to be communicated to the online system 140. In this example, the online system 140 may provide the content item to one or more third-party systems 130 after the tracking module 230 embeds the tracking pixel into the content item. Continuing with this example, upon receiving a request to present the content item at a third-party system 130, the online system 140 may receive information describing the request (e.g., user-identifying information associated with the individual from whom the request was received, a time of the request, information identifying the content item, etc.) via the tracking pixel.

In some embodiments, the tracking mechanisms and/or interactive elements also may communicate information to the online system 140 describing various types of actions performed by individuals presented with a content item (e.g., clicks on the content item, purchases made in association with being presented with the content item, etc.). For example, the tracking module 230 may generate code corresponding to a tracking pixel that allows information describing a purchase associated with a content item to be communicated to the online system 140. In this example, the online system 140 may provide the tracking pixel to a third-party system 130, which may embed the tracking pixel into a purchase confirmation page associated with the content item at the third-party system 130. Continuing with this example, upon receiving a request to present the purchase confirmation page at the third-party system 130, the online system 140 may receive information describing the request (e.g., user-identifying information associated with the individual from whom the request was received, a description of the item(s) purchased, an amount of the purchase, a time of the purchase, etc.) via the tracking pixel. As an additional example, upon receiving a request to present content (e.g., in a newsfeed associated with a user profile of an online system user), the tracking module 230 may set a cookie by sending instructions to a browser on a client device 110 from which the request was received. In this example, the instructions may instruct the browser to store information describing the request in a cookie and to send the cookie back in conjunction with subsequent requests communicated to a server (e.g., the web server 270) at the online system 140. In this example, upon receiving a request from the same client device 110 to express a preference for a content item via a plug-in associated with the online system 140 at a third-party system 130 (e.g., a content publisher), the online system 140 also may receive the cookie from the browser in conjunction with the request. The functionality of the tracking module 230 is further described below in conjunction with FIG. 3A.

The user identification module 235 identifies (e.g., as shown in step 330 of FIG. 3A) individuals who are online system users. The individuals may include individuals presented with a content item and/or individuals who performed various actions in association with being presented with a content item. The user identification module 235 may identify individuals who are online system users based on comparisons of user-identifying information associated with the individuals to user-identifying information associated with online system users. For example, suppose that a tracking pixel is embedded into a content item that is presented to an individual by a content publisher. In this example, upon receiving a request to present the content item to the individual at the content publisher, the online system 140 may receive user-identifying information associated with the individual (e.g., an IP address associated with a client device 110 from which the request was received) via the tracking pixel. Continuing with this example, the user identification module 235 may compare the user-identifying information to user-identifying information maintained in the user profile store 205 that is stored in association with user profiles of various online system users. In the above example, the user identification module 235 may identify an individual as an online system user if a user profile of the online system user is associated with user-identifying information that matches the user-identifying information received via the tracking pixel. The functionality of the user identification module 235 is further described below in conjunction with FIG. 3A.

The frequency determination module 240 may determine (e.g., as shown in step 335 of FIG. 3A) a known total number of presentations of a content item within a specified period of time. The frequency determination module 240 may make this determination based on information stored in the online system 140 describing presentations of the content item. For example, the frequency determination module 240 may access the content store 210 and identify information describing each presentation of a content item to various individuals within a specified period of time. In this example, the frequency determination module 240 may determine the known total number of presentations of the content item within the specified period of time to be a sum of the presentations of the content item described by the identified information. In some embodiments, the frequency determination module 240 may determine a known total number of times an action has been performed in association with a presentation of a content item within a specified period of time. Similar to determining a known total number of presentations of a content item within a specified period of time, the frequency determination module 240 may make this determination based on information stored in the online system 140 (e.g., in the action log 220) describing actions performed in association with presentations of the content item.

The frequency determination module 240 determines (e.g., as shown in step 340 of FIG. 3A) impression frequencies associated with a content item for online system users. The frequency determination module 240 may determine an impression frequency associated with a content item for an online system user that indicates a number of times that the content item was presented to the user by one or more third-party systems 130 within a specified period of time. The frequency determination module 240 may determine an impression frequency associated with a content item for an online system user by accessing information stored in the online system 140 describing presentations of the content item. For example, the frequency determination module 240 may access the content store 210 and identify information describing each presentation of a content item to the same online system user. In this example, the frequency determination module 240 may determine the impression frequency associated with the content item for the online system user to be a sum of the number of presentations of the content item to the user. In some embodiments, the frequency determination module 240 may determine an interaction frequency associated with a content item for an online system user that indicates a number of times that the user performed an action in association with being presented with the content item by one or more third-party systems 130 within a specified period of time. Similar to determining an impression frequency, the frequency determination module 240 may determine an interaction frequency associated with a content item for an online system user based on information stored in the online system 140 (e.g., in the action log 220) describing actions performed in association with presentations of the content item.

The frequency determination module 240 may store (e.g., as shown in step 345 of FIG. 3A) impression frequencies associated with a content item for online system users. In some embodiments, once the frequency determination module 240 has determined an impression frequency associated with a content item for an online system user, the frequency determination module 240 may store this information as an attribute for the user. For example, the frequency determination module 240 may store an impression frequency associated with a content item for an online system user in association with a user profile of the user in the user profile store 205. In embodiments in which the frequency determination module 240 determines an interaction frequency associated with a content item for an online system user, the frequency determination module 240 also may store this information as an attribute for the user.

In some embodiments, based on de-biased information describing impression frequencies associated with a content item for online system users (described below), the frequency determination module 240 may determine a number or a proportion/percentage of the de-biased population of online system users who were presented with the content item for each impression frequency. For example, based on de-biased information describing impression frequencies associated with a content item for online system users, the frequency determination module 240 may determine that 40% of the de-biased population of online system users who were presented with the content item were presented with the content item once, 20% were presented with the content item twice, 10% were presented with the content item three times, 10% were presented with the content item four times, and 20% were presented with the content item five or more times. In embodiments in which the online system 140 receives information describing an action performed by individuals in association with being presented with a content item by one or more third-party systems 130, the frequency determination module 240 similarly may determine a number or a proportion/percentage of the de-biased population of online system users who performed the action for each interaction frequency. The functionality of the frequency determination module 240 is further described below in conjunction with FIGS. 3A and 3B.

The de-biasing module 245 de-biases (e.g., as shown in step 350 of FIG. 3B) information describing impression frequencies associated with a content item for a population of online system users included among a population of individuals to whom the content item was presented to adjust for differences between the population of online system users and the population of individuals. The de-biasing module 245 may de-bias information describing impression frequencies associated with a content item for online system users presented with the content item by normalizing the population of online system users identified from the individuals presented with the content item (e.g., by the user identification module 235). In some embodiments, the de-biasing module 245 also or alternatively may de-bias information describing interaction frequencies associated with a content item for online system users who performed an action in association with being presented with a content item by normalizing a population of online system users included among a population of individuals who performed the action.

The de-biasing module 245 may de-bias the information based on an estimate of attributes (e.g., demographic information) for all individuals presented with a content item and/or based on an estimate of attributes for all individuals who performed an action in association with being presented with the content item. Attributes for individuals may be estimated based on information received from the individuals, based on information received from one or more third-party systems 130 that presented the content item to the individuals, or based on information received from any other suitable entity. For example, the online system 140 may provide a content item to one or more content publishers, which may then present the content item to various individuals. In this example, the online system 140 may collaborate with the content publishers, such that the content publishers may provide information to the online system 140 describing attributes for one or more individuals presented with the content item (e.g., user-identifying information associated with each individual to whom the content item was presented). In this example, the de-biasing module 245 may then estimate attributes for all individuals presented with the content item based on the received information. As an additional example, the online system 140 may receive information describing attributes for various individuals presented with a content item via responses to a survey or a questionnaire communicated to the individuals. In this example, the de-biasing module 245 may then estimate attributes for all individuals presented with the content item based on the received information.

In some embodiments, the de-biasing module 245 may use a randomized de-synching process to de-bias information describing impression frequencies associated with a content item for online system users included among a population of individuals presented with the content item. In various embodiments, the randomized de-synching process may involve using a sampling method to extrapolate attributes for individuals presented with the content item (e.g., if there is a known difference between one or more attributes associated with online system users included among the individuals presented with the content item and the same attributes associated with the individuals). In such embodiments, the de-biasing module 245 may perform the sampling method based at least in part on a set of attributes for the online system users included among the individuals presented with the content item and a set of corresponding attributes for the individuals. For example, suppose that the de-biasing module 245 estimates that about 45% of individuals presented with a content item by various third-party systems 130 are female and about 55% of the individuals are male (e.g., based on survey data received from individuals presented with the content item). In this example, suppose also that of the online system users included among the individuals presented with the content item, about 65% are female and about 35% are male. In this example, the de-biasing module 245 may select a sampling method, such as a stratified sampling method or a cluster sampling method, to sample the online system users who were presented with the content item by the third-party systems 130, in which the online system users are divided into strata or clusters based on their gender. Here, the de-biasing module 245 may obtain 45% of its sample from the stratum or cluster including female online system users who were presented with the content item and 55% of its sample from the stratum or cluster including male online system users who were presented with the content item. Continuing with this example, the de-biasing module 245 may extrapolate attributes for all individuals presented with the content item based on proportions of attributes associated with the sampled users. In embodiments in which the de-biasing module 245 de-biases information describing interaction frequencies associated with a content item for online system users who performed an action in association with being presented with the content item, the de-biasing module 245 may use a randomized de-synching process to de-bias the information in an analogous manner. The functionality of the de-biasing module 245 is further described below in conjunction with FIG. 3B.

The machine-learning module 250 trains (e.g., as shown in step 355 of FIG. 3B) a set of machine-learning models to infer a reach (i.e., a number of unique individuals for whom impressions were achieved during a given time period) of a content item for each of multiple impression frequencies. The machine-learning module 250 may train the set of machine-learning models based at least in part on de-biased information describing impression frequencies associated with a content item for online system users presented with the content item. For example, for each of multiple impression frequencies associated with a content item (e.g., one impression, two impressions, three impressions, etc.), the machine-learning module 250 may train a machine-learning model to infer a number of individuals who have been presented with the content item a number of times corresponding to the impression frequency during a given time period. In this example, the machine-learning module 250 may train the machine-learning model based at least in part on de-biased information describing an impression frequency associated with the content item for one or more online system users presented with the content item during the time period. In embodiments in which the de-biasing module 245 de-biases information describing interaction frequencies for online system users presented with a content item, the machine-learning module 250 may train a set of machine-learning models to infer a number of unique individuals who performed a corresponding action in association with being presented with the content item during a given time period for each of multiple interaction frequencies.

Features used to train the set of machine-learning models may include de-biased information describing impression frequencies associated with a content item for online system users presented with the content item (e.g., a number or a proportion/percentage of the de-biased population of online system users presented with the content item for each impression frequency and the attributes associated with these users), information identifying third-party systems 130 that presented the content item, de-biased information describing interaction frequencies associated with a content item for online system users who performed an action in association with being presented with the content item, etc. The set of machine-learning models may be trained using a logistic regression algorithm, a log-linear regression algorithm, a neural network algorithm, or any other suitable learning algorithm. In some embodiments, the set of machine-learning models may be normalized against each other.

In various embodiments, in addition to or as an alternative to de-biasing information describing the impression frequencies and/or the interaction frequencies associated with a content item for online system users (e.g., by the de-biasing module 245), the machine-learning module 250 may adjust for differences among the population of online system users included among the individuals. The machine-learning module 250 may do so by training the set of machine-learning models based at least in part on a particular set of attributes associated with the online system users and/or the individuals. For example, the machine-learning module 250 may train the set of machine-learning models based on an IP address or an IP address and user agent combination associated with each online system user and/or each individual presented with the content item. As an additional example, the machine-learning module 250 may train the set of machine-learning models based on an average number of cookies and/or an average number of stable cookies (i.e., cookies that were not deleted by an online system user and subsequently reset for the user) associated with the online system users included among the individuals. The functionality of the machine-learning module 250 is further described below in conjunction with FIG. 3B.

The inference adjustment module 255 determines (e.g., as shown in step 370 of FIG. 3B) an inferred total number of presentations of a content item. In some embodiments, the inference adjustment module 255 may determine an inferred total number of presentations of a content item based on an inferred reach of the content item for each of multiple impression frequencies. In such embodiments, the inference adjustment module 255 may determine the inferred total number of presentations of the content item by computing a product of an inferred reach for an impression frequency and a number of impressions corresponding to the impression frequency. The inference adjustment module 255 may repeat this process for each impression frequency and then determine the inferred total number of presentations of the content item to be a sum of the products. For example, suppose that using a set of machine-learning models, the online system 140 predicts that 500 individuals were presented with a content item once, 400 individuals were presented with the content item twice, 300 individuals were presented with the content item three times, 200 individuals were presented with the content item four times, and 200 individuals were presented with the content item at least five times. In this example, the inference adjustment module 255 may determine an inferred total number of impressions of the content item to be 4,000 (i.e., (500 individuals×1 impression/individual)+(400 individuals×2 impressions/individual)+(300 individuals×3 impressions/individual)+(200 individuals×4 impressions/individual)+(200 individuals×5 or more impressions/individual)). Similarly, in embodiments in which the machine-learning module 250 trains a set of machine-learning models to infer a number of individuals who performed an action in association with being presented with a content item, the online system 140 may use the set of machine-learning models to infer a number of individuals who performed the action for each interaction frequency and the inference adjustment module 255 may then determine an inferred total number of times the action has been performed based on the inferences.

The inference adjustment module 255 compares (e.g., as shown in step 375 of FIG. 3B) an inferred total number of presentations of a content item to a known total number of presentations of the content item. In some embodiments, the known total number of presentations of a content item may be determined by the frequency determination module 240, as described above. In other embodiments, the known total number of presentations of the content item may be retrieved by the inference adjustment module 255. For example, the inference adjustment module 255 may access the content store 210 and retrieve a value stored as an impression count in association with an object representing the content item. In this example, the value stored as the impression count corresponds to the known total number of presentations of the content item. In some embodiments, the inference adjustment module 255 also or alternatively may compare an inferred total number of times an action has been performed in association with a presentation of a content item to a known total number of times the action has been performed in association with a presentation of the content item. In such embodiments, the known total number of times the action has been performed may be determined by the frequency determination module 240, as described above. Alternatively, the known total number of times the action has been performed may be retrieved by the inference adjustment module 255. For example, the inference adjustment module 255 may access the content store 210 and retrieve a value stored as an action count in association with an object representing the content item. In this example, the value stored as the action count corresponds to the known total number of times the action has been performed in association with presentations of the content item.

The inference adjustment module 255 may adjust (e.g., as shown in step 380 of FIG. 3B) an inferred reach of a content item for a set of impression frequencies. In some embodiments, the inference adjustment module 255 may adjust the inferred reach of a content item for one or more impression frequencies in response to determining that the inferred total number of presentations of the content item is greater than the known total number of presentations of the content item. For example, suppose that information received at the online system 140 describing each presentation of a content item indicates that the content item was presented a total of 3,900 times. In this example, if the inferred total number of presentations of the content item is 4,000, which is 100 more presentations than the known total number of presentations of the content item, the inference adjustment module 255 may adjust the inferred reach of the content item for one or more impression frequencies. Alternatively, in the above example, if the information received at the online system 140 describing each presentation of the content item indicates that the content item was presented a total of 4,000 times, the inference adjustment module 255 may not adjust the inferred reach of the content item for any of the impression frequencies. Similarly, in embodiments in which the inference adjustment module 255 determines an inferred total number of times an action was performed in association with presentations of a content item, the inference adjustment module 255 may adjust the inferred number of individuals who performed the action for a set of the interaction frequencies in response to determining that the inferred total number of times the action has been performed is greater than a known total number of times the action has been performed.

The inference adjustment module 255 may adjust the inferred reach of a content item for one or more impression frequencies such that the number of individuals presented with the content item is maintained and the inferred total number of impressions is no longer greater than the known total number of impressions. In some embodiments, the inference adjustment module 255 may use a linear approach that reduces the inferred reach of a content item by a given number of individuals for a highest impression frequency and increases the inferred reach of the content item for the lowest impression frequency by the same number of individuals. For example, suppose that there are N impression frequencies, in which N indicates a number of times that a content item was presented to an individual. In this example, using a linear approach, the inference adjustment module 255 may reduce the inferred reach for impression frequency N by a given number of individuals and increase the inferred reach for impression frequency 1 by the same number of individuals.

In various embodiments, the inference adjustment module 255 may use an exponential decay approach that reduces the inferred reach of a content item by a given number of individuals for a highest impression frequency and increases the inferred reach of the content item for multiple lower impression frequencies by a fraction of the same number of individuals. In such embodiments, the fraction of the number of individuals by which the inference adjustment module 255 increases the inferred reach for an impression frequency may be proportional to the number of impressions corresponding to the impression frequency. In the above example, using an exponential decay approach, the inference adjustment module 255 may reduce the inferred reach for impression frequency N by a given number of individuals, increase the inferred reach for impression frequency N−1 by ½ of this number of individuals, increase the inferred reach for impression frequency N−2 by ¼ of this number of individuals, . . . etc. The functionality of the inference adjustment module 255 is further described below in conjunction with FIGS. 3B, 4A, and 4B.

The report generator 260 may generate (e.g., as shown in step 385 of FIG. 3B) a report describing the inferred reach of a content item for each of multiple impression frequencies. In some embodiments, the report may reflect any adjustments to the inferred reach (e.g., adjustments made by the inference adjustment module 255). The report may include one or more histograms that describe the inferred reach of a content item for each impression frequency. For example, the report generator 260 may generate a histogram, in which each bar of the histogram corresponds to an impression frequency and a height of each bar is proportional to the inferred reach of the content item or the adjusted inferred reach of the content item for the impression frequency. In the above example, the report generator 260 may generate multiple additional histograms, in which each histogram corresponds to a different content publisher that presented the content item to various individuals, a different demographic group to whom the content item was presented, etc. In some embodiments, the report generator 260 may generate a report describing the inferred number of individuals who performed an action in association with being presented with a content item for each of multiple interaction frequencies in an analogous manner. The functionality of the report generator 260 is further described below in conjunction with FIG. 3B.

The user interface generator 265 may generate (e.g., as shown in step 390 of FIG. 3B) a user interface including a report describing an inferred reach of a content item for each of multiple impression frequencies. For example, if the report generator 260 generates a report that includes multiple histograms, the user interface generator 265 may generate a user interface that includes each of the histograms. In embodiments in which the report describes an inferred number of individuals who performed an action in association with being presented with a content item for each of multiple interaction frequencies, the user interface generator 265 also or alternatively may generate a user interface including the report. The functionality of the user interface generator 265 is further described below in conjunction with FIG. 3B.

The web server 270 links the online system 140 via the network 120 to the one or more client devices 110, as well as to the one or more third-party systems 130. The web server 270 serves web pages, as well as other content, such as JAVA®, FLASH®, XML and so forth. The web server 270 may receive and route messages between the online system 140 and the client device 110, for example, instant messages, queued messages (e.g., email), text messages, short message service (SMS) messages, or messages sent using any other suitable messaging technique. A user may send a request to the web server 270 to upload information (e.g., images or videos) that are stored in the content store 210. Additionally, the web server 270 may provide application programming interface (API) functionality to send data directly to native client device operating systems, such as IOS®, ANDROID™, WEBOS® or BlackberryOS.

Furthermore, the web server 270 may receive (e.g., as shown in step 320 of FIG. 3A) information describing presentations of a content item and/or an action performed in association with presentations of a content item by one or more third-party systems 130 via one or more tracking mechanisms. In some embodiments, the web server 270 may receive the information via a tracking pixel. For example, suppose that the tracking module 230 generates and embeds a tracking pixel into a content item and the online system 140 then provides the content item to a third-party system 130, which then presents the content item to various individuals. In this example, upon receiving a request to present the content item to an individual at the third-party system 130, the web server 270 may receive an IP address associated with a client device 110 from which the request was received, and information identifying the content item and the third-party system 130 at which the content item is to be presented to the individual. The web server 270 also may receive the information via a cookie. In the above example, the web server 270 also may receive a date/time that the request was received from a cookie stored at the client device 110.

In some embodiments, the web server 270 may communicate information describing each presentation of a content item and/or each performance of an action in association with a presentation of the content item to the action logger 215, which may store this information. For example, suppose that the web server 270 receives information describing a presentation of a content item and information describing an action performed in association with the presentation of the content item. In this example, the web server 270 may communicate this information to the action logger 215, which may store the information in the action log 220 and/or in the content store 210 in association with an object representing the content item.

Figure 3A:
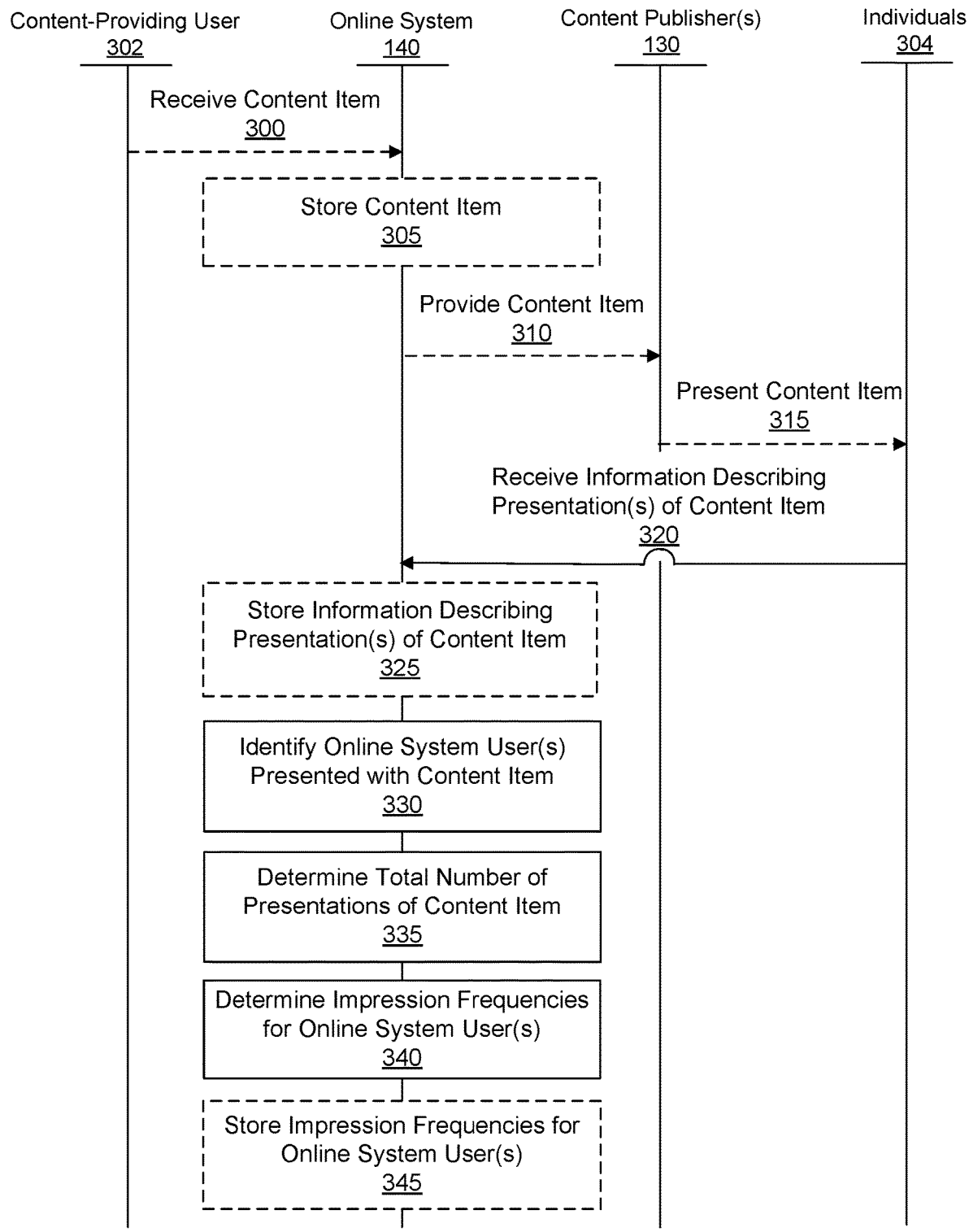
FIGS. 3A and 3B are interaction diagrams of a method for inferring a reach of a content item presented to individuals by one or more content publishers for a set of impression frequencies, in accordance with an embodiment.
Figure 3B:
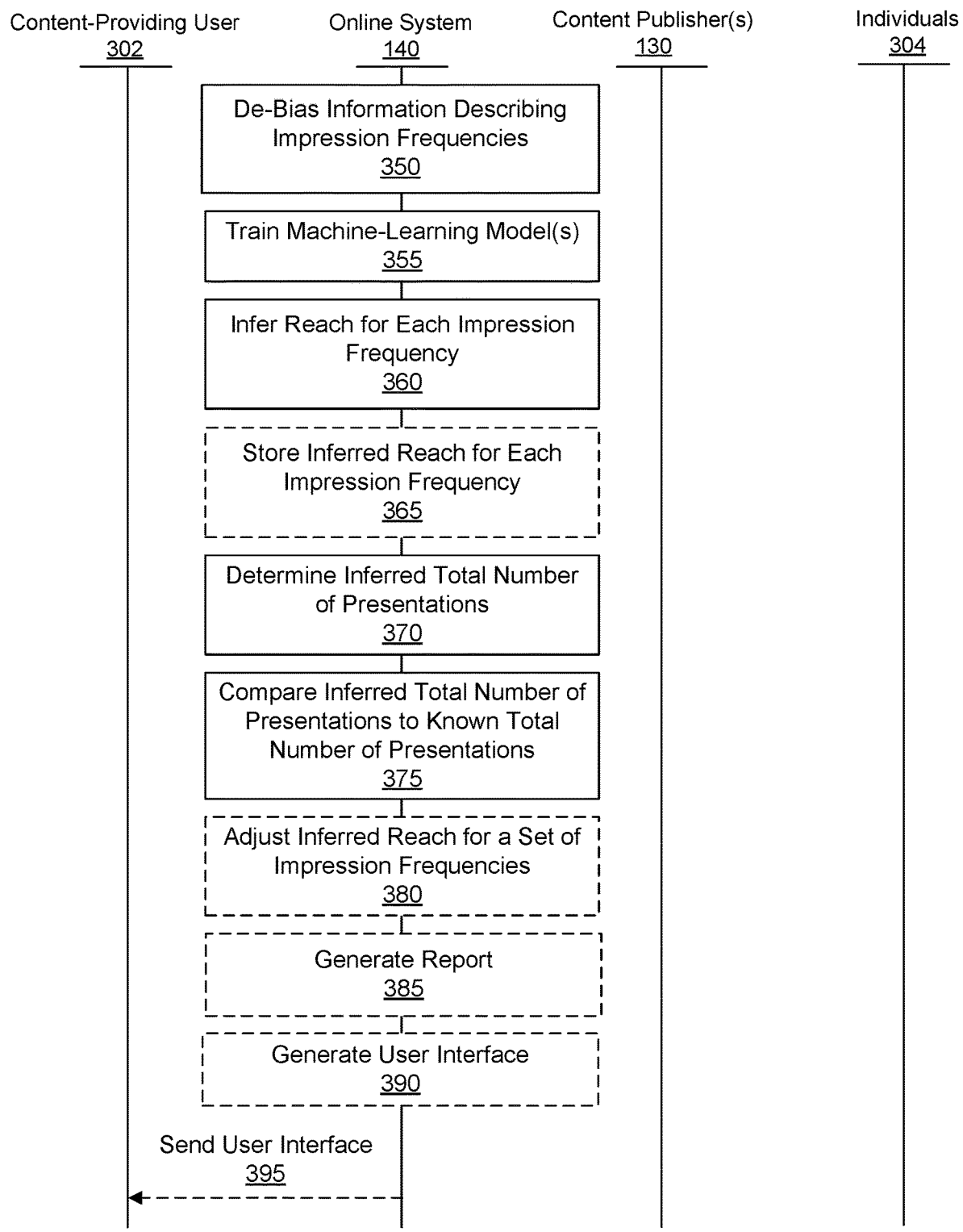

Inferring a Reach of a Content Item Presented to Individuals by One or More Content Publishers for a Set of Impression Frequencies FIGS. 3A and 3B are interaction diagrams of a method for inferring a reach of a content item presented to individuals by one or more content publishers for a set of impression frequencies. In other embodiments, the method may include different and/or additional steps than those shown in FIGS. 3A and 3B. Additionally, steps of the method may be performed in a different order than the order described in conjunction with FIGS. 3A and 3B.

The online system 140 may receive 300 a content item from a content-providing user 302 of the online system 140. For example, the online system 140 may receive 300 an advertisement from an advertiser or other content-providing user 302 of the online system 140. The content item may include various elements, including a title, an image, a video, text, a call to action (e.g., to click on the content item), a link to a landing page associated with the content item (e.g., a brand page at which a purchase associated with the content item may be made), etc. The content item may be received 300 in conjunction with information identifying content publishers 130 to which the content item is to be provided, information associated with presentations of the content item to be tracked (e.g., actions performed in association with being presented with the content item), information describing time intervals during which the content item is to be presented to online system users or to other individuals, or any other suitable types of information.

In some embodiments, the online system 140 may store 305 the content item (e.g., in the content store 210). The online system 140 may store 305 the content item in association with information identifying the content-providing user 302, information that identifies content publishers 130 to which the content item is to be provided, information associated with presentations of the content item to be tracked, etc. For example, if an advertiser provides an advertisement to the online system 140, the online system 140 may store 305 an object representing the advertisement among objects representing additional content items received from other content-providing users of the online system 140 (e.g., in the content store 210).

The online system 140 may provide 310 the content item to one or more content publishers 130 for presentation to various individuals 304. As described above, presentations of the content item to individuals 304 by the content publishers 130 may be tracked using one or more tracking mechanisms and/or interactive elements generated and/or set by the online system 140 (e.g., using the tracking module 230). As also described above, in some embodiments, the tracking mechanisms and/or interactive elements also may track various types of actions performed by individuals 304 presented with the content item (e.g., clicks on the content item, purchases made in association with being presented with the content item, etc.).

Each content publisher 130 to which the content item is provided 310 may then present 315 the content item to various individuals 304. For example, a content publisher 130 may present 315 the content item in a banner or in a scrollable feed. In some embodiments, a content publisher 130 may present 315 the content item to individuals 304 based on information provided by the online system 140 (e.g., geographic locations associated with the individuals 304, one or more time intervals during which the content item is to be presented 315, etc.).

The online system 140 then receives 320 information describing each presentation of the content item by one or more content publishers 130. In some embodiments, the online system 140 may receive 320 the information from each content publisher 130 that presented 315 the content item to an individual 304. For example, the online system 140 may collaborate with content publishers 130 to which a content item was provided 310, such that the content publishers 130 may provide information to the online system 140 describing each presentation of the content item (e.g., user-identifying information associated with each individual 304 to whom the content item was presented 315). In various embodiments, the information is received at the online system 140 (e.g., at the web server 270) via one or more tracking mechanisms (e.g., a tracking pixel, a cookie, etc.).

Information describing a presentation of the content item may include information identifying a content publisher 130 that presented 315 the content item, information identifying an individual 304 to whom the content item was presented 315, information describing an action performed by the individual 304 in association with being presented 315 with the content item, a date/time of the presentation/performance of the action, etc. For example, upon receiving a request from an individual 304 to comment on a content item via an interactive element associated with the online system 140 at a content publisher 130, the online system 140 may receive 320 an IP address associated with a client device 110 from which the request was received, a username unique to an online system user, information identifying the content item and the content publisher 130 at which the content item is to be presented 315, and a date/time that the request was received.

The online system 140 may store 325 (e.g., using the action logger 215) the information describing each presentation of the content item. For example, the online system 140 may store 325 information describing a presentation of a content item and information describing a performance of an action in association with the presentation of the content item in a table (e.g., in the action log 220 and/or in the content store 210 in association with an object representing the content item). In various embodiments, the online system 140 also may store information describing a known total number of presentations of the content item and/or a known total number of times an action was performed in association with presentations of the content item by one or more content publishers 130. For example, the online system 140 may maintain an impression count and an action count in the content store 210 that are stored in association with an object representing a content item. In this example, the impression count is initialized to a value of zero and is incremented by a value of one each time the online system 140 receives 320 information describing a presentation of the content item to an individual 304, such that the known total number of presentations of the content item at a particular time may be retrieved from the content store 210 by accessing the impression count. Similarly, in this example, the action count is initialized to a value of zero and is incremented by a value of one each time the online system 140 receives information describing an action performed in association with each presentation of the content item, such that the known total number of times the action has been performed at a particular time may be retrieved from the content store 210 by accessing the action count.

The online system 140 identifies (in step 330, e.g., using the user identification module 235) users of the online system 140 included among the individuals 304 presented 315 with the content item. As described above, the online system 140 may identify (in step 330) users based on comparisons of user-identifying information associated with the individuals 304 to user-identifying information associated with online system users (e.g., matching IP addresses, usernames, email addresses, etc.). In some embodiments, user-identifying information associated with the individuals 304 may be received in conjunction with the information describing each presentation of the content item while user-identifying information associated with online system users may be maintained in the online system 140 (e.g., in the user profile store 205).

The online system 140 determines 335 (e.g., using the frequency determination module 240) a known total number of presentations of the content item. In some embodiments, the online system 140 may determine 335 the known total number of presentations of the content item by identifying information describing each presentation of the content item to various individuals within a specified period of time (e.g., in the content store) and by determining a sum of these presentations. In other embodiments, the online system 335 may determine the known total number of presentations of the content item by accessing information describing an impression count associated with the content item maintained in the online system 140 (e.g., in the content store 210). In various embodiments, the online system 140 also may determine 335 a known total number of times an action has been performed in association with presentations of the content item in an analogous manner.

The online system 140 then determines (in step 340, e.g., using the frequency determination module 240) impression frequencies associated with the content item for the identified online system users. As described above, an impression frequency associated with a content item for an online system user indicates a number of times that the content item was presented 315 to the user by one or more third-party systems 130 (e.g., content publishers 130) within a specified period of time. As also described above, the online system 140 may determine 340 an impression frequency associated with the content item for an online system user by accessing information stored 325 in the online system 140 (e.g., in the content store 210) describing presentations of the content item. In some embodiments, the online system 140 also may determine interaction frequencies associated with the content item for the identified online system users that each indicate a number of times that a user performed an action in association with being presented 315 with the content item by one or more content publishers 130 within a specified period of time. In such embodiments, the online system 140 may determine an interaction frequency by accessing information stored in the online system 140 (e.g., in the action log 220) describing actions performed in association with presentations of the content item.

In some embodiments, the online system 140 may store (in step 345, e.g., using the frequency determination module 240) impression frequencies associated with the content item for online system users. The online system 140 may store 345 the impression frequencies as attributes for the users. For example, the online system 140 may store 345 an impression frequency associated with a content item for an online system user in association with a user profile of the user (e.g., in the user profile store 205). In embodiments in which the online system 140 determines an interaction frequency associated with the content item for an online system user, the online system 140 also may store this information as an attribute for the user.

The online system 140 de-biases 350 (e.g., using the de-biasing module 245) information describing the impression frequencies. As described above, the online system 140 may de-bias 350 information describing impression frequencies associated with the content item for online system users presented 315 with the content item by normalizing the population of online system users identified 330 from the individuals 304 presented 315 with the content item. The online system 140 may do so based on an estimate of attributes (e.g., demographic information) for the individuals 304 presented 315 with the content item using a randomized de-synching process (e.g., a sampling method used to extrapolate attributes for the individuals 304 presented 315 with the content item). As also described above, in some embodiments, the online system 140 may de-bias information describing interaction frequencies associated with the content item for online system users who performed an action in association with being presented 315 with the content item in an analogous manner.

In some embodiments, the online system 140 may determine (e.g., using the frequency determination module 240) proportions/percentages of the de-biased population of online system users for various impression frequencies. Based on the de-biased information describing impression frequencies associated with the content item for online system users, the online system 140 may determine a number or a proportion/percentage of the de-biased population of online system users who were presented 315 with the content item for each impression frequency. In embodiments in which the online system 140 receives information describing an action performed by individuals 304 in association with being presented 315 with the content item by one or more content publishers 130, the online system 140 similarly may determine a number or a proportion/percentage of the de-biased population of online system users who performed the action for each interaction frequency.

The online system 140 trains 355 (e.g., using the machine-learning module 250) a set of machine-learning models to infer a reach for each of multiple impression frequencies. As described above, the online system 140 may train 355 the set of machine-learning models based at least in part on the de-biased information describing impression/interaction frequencies associated with the content item for online system users presented 315 with the content item (e.g., a number or a proportion/percentage of the de-biased population of online system users presented 315 with the content item for each impression frequency and the attributes associated with these users), information identifying the content publishers 130 that presented 315 the content item, etc. As also described above, the online system 140 may adjust for differences among the population of online system users presented 315 with the content item and the population of individuals 304 presented 315 with the content item based at least in part on an IP address or an IP address and user agent combination associated with each online system user/individual 304 presented 315 with the content item, an average number of cookies or an average number of stable cookies associated with the online system users included among the individuals 304, etc.

Once trained, the online system 140 uses the set of machine-learning models to infer 360 the number of individuals 304 presented 315 with the content item for each impression frequency. For example, the online system 140 may use one of the trained machine-learning models to infer 360 a number of individuals 304 presented 315 with the content item once (i.e., a reach of the content item for an impression frequency of one) during a specified period of time. In this example, the online system 140 may repeat this process by using a different trained model to infer 360 a reach of the content item for an impression frequency of two, an impression frequency of three, an impression frequency of four, etc. during the specified period of time In some embodiments, the online system 140 may then store 365 the inferred number of individuals 304 presented 315 with the content item (i.e., the inferred reach) for each impression frequency. For example, the online system 140 may store 365 the inferred reach for each impression frequency associated with a content item in association with an object maintained in the online system 140 representing the content item (e.g., in the content store 210).

The online system 140 determines 370 (e.g., using the inference adjustment module 255) an inferred total number of presentations of the content item. The online system 140 may determine 370 the inferred total number of presentations of the content item based on the inferred reach of the content item for each impression frequency (e.g., by computing a product of the inferred reach for each impression frequency and a number of impressions corresponding to the impression frequency and by summing the products). In embodiments in which the machine-learning module 250 trains the set of machine-learning models to infer a number of individuals 304 who performed an action in association with being presented 315 with the content item, the online system 140 may determine an inferred total number of times the action has been performed based on the inferences for each interaction frequency in a similar manner.

The online system 140 compares 375 (e.g., using the inference adjustment module 255) the inferred total number of presentations of the content item to the known total number of presentations of the content item. In some embodiments, the online system 140 also or alternatively may compare an inferred total number of times an action has been performed in association with presentations of the content item to a known total number of times the action has been performed in association with presentations of the content item. The online system 140 may then adjust 380 (e.g., using the inference adjustment module 255) the inferred reach of the content item for a set of the impression frequencies in response to determining that the inferred total number of presentations of the content item is greater than the known total number of presentations of the content item. In various embodiments, the online system 140 may not adjust 380 the inferred reach of the content item for any of the impression frequencies in response to determining that the inferred total number of presentations of the content item is not greater than the known total number of presentations of the content item. In some embodiments, the online system 140 may adjust the inferred number of individuals 304 who performed an action for a set of the interaction frequencies in response to determining that an inferred total number of times that the action has been performed is greater than a known total number of times that the action has been performed.

In various embodiments, the online system 140 may adjust 380 the inferred reach for one or more impression frequencies such that the number of individuals 304 presented 315 with the content item is maintained and the inferred total number of impressions is no longer greater than the known total number of impressions (e.g., using a linear approach or an exponential decay approach). To illustrate examples of the linear approach and the exponential decay approach, suppose that for January 2018, using a set of machine-learning models, the online system 140 overestimated the total number of presentations of a content item by 100 presentations, as shown in histogram 400A in FIGS. 4A and 4B, in which the online system 140 determined 370 an inferred total number of presentations of the content item to be 4,000, in which 500 individuals 304 were inferred 360 to have been presented 315 with the content item once, 400 individuals 304 were inferred 360 to have been presented 315 with the content item twice, 300 individuals 304 were inferred 360 to have been presented 315 with the content item three times, 200 individuals 304 were inferred 360 to have been presented 315 with the content item four times, and 200 individuals 304 were inferred 360 to have been presented 315 with the content item five or more times.

Figure 4A:
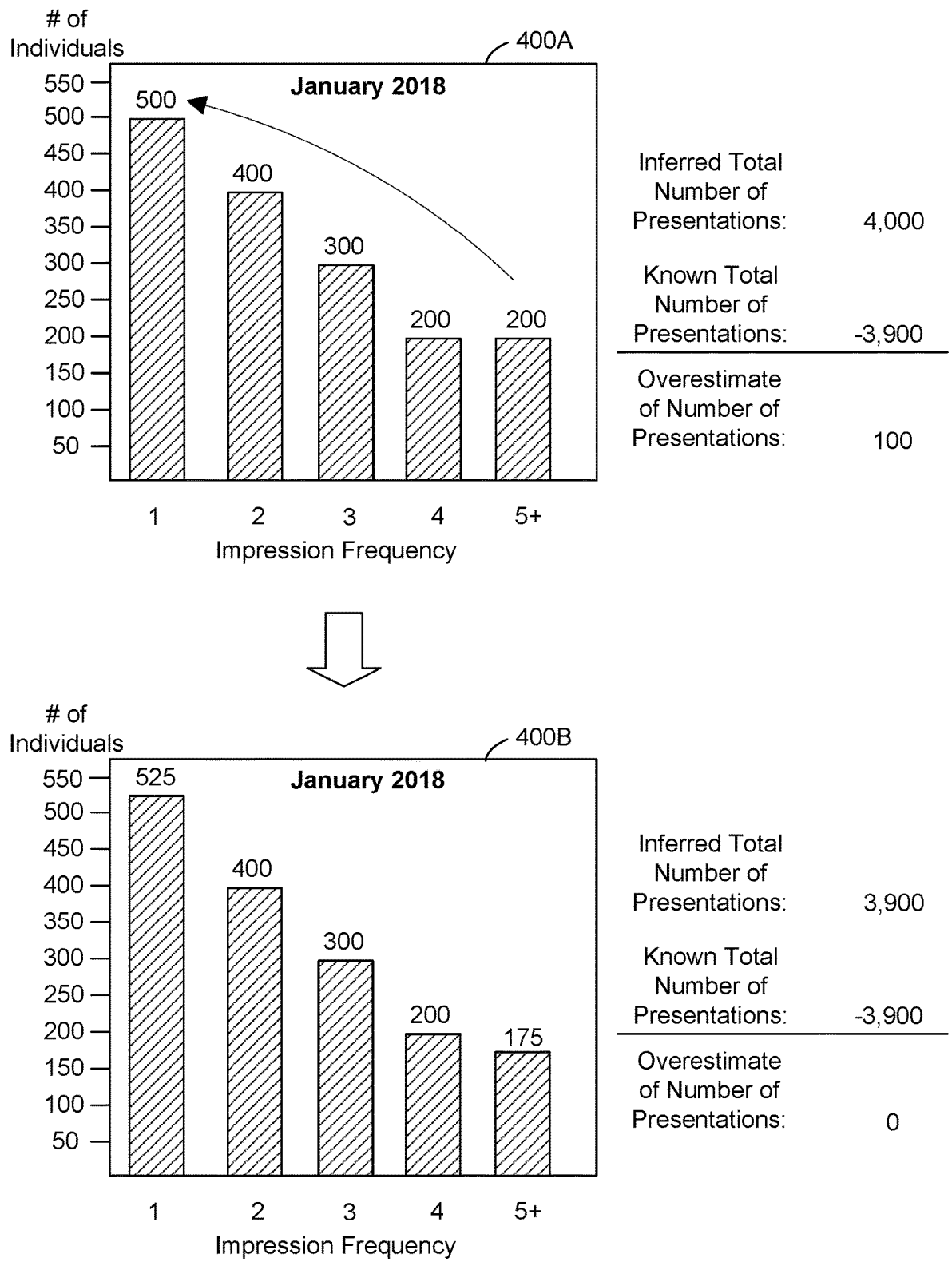
FIGS. 4A and 4B are example approaches for adjusting an inferred reach of a content item for one or more impression frequencies, in accordance with an embodiment.
Figure 4B:
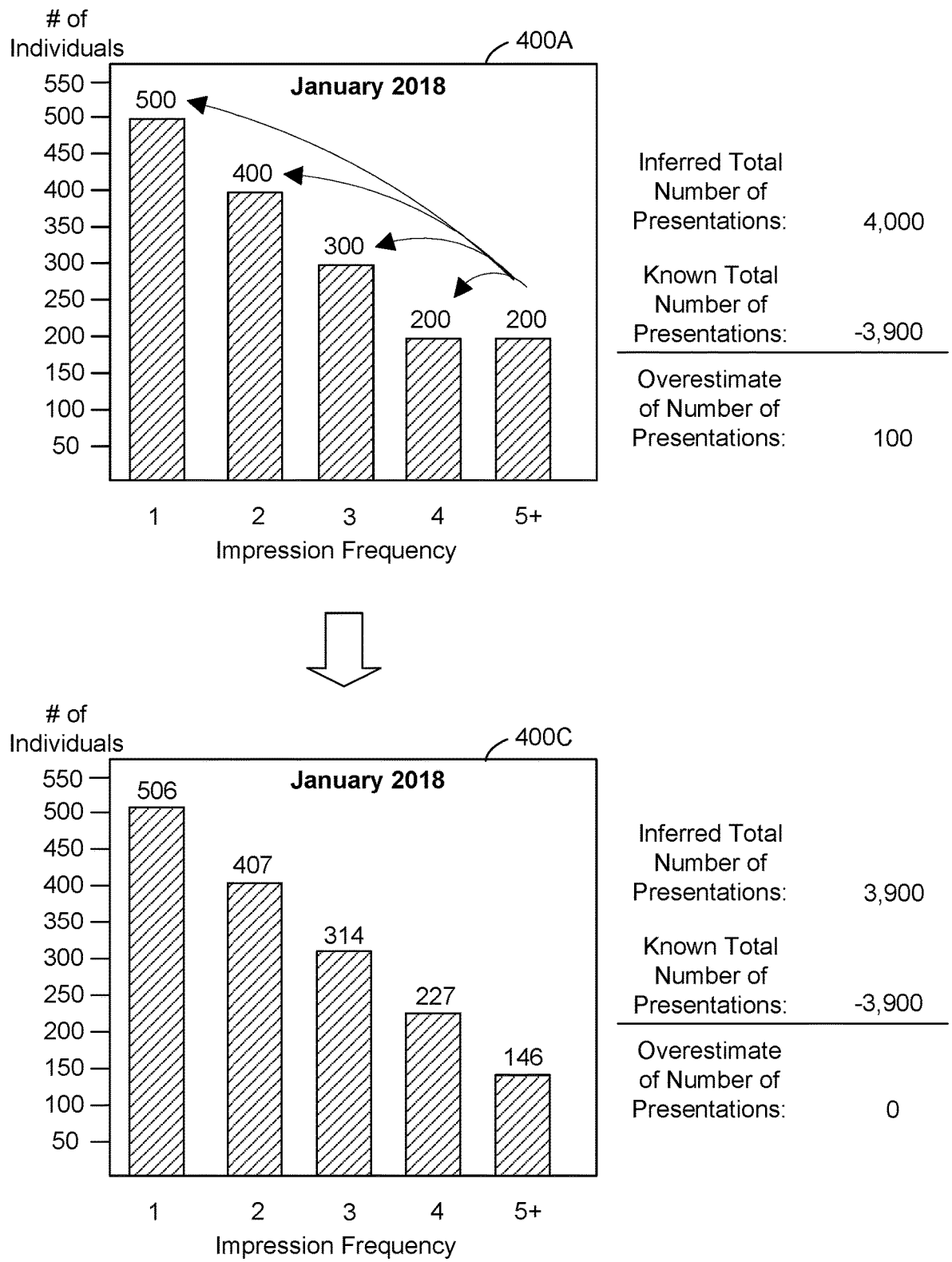

Referring first to FIG. 4A, which illustrates the linear approach, the online system 140 may reduce the inferred number of individuals 304 presented 315 with the content item five or more times by 25 individuals 304 and increase the inferred number of individuals 304 presented 315 with the content item once by 25 individuals 304, such that the inferred total number of presentations of the content item is no longer greater than the known total number of presentations of the content item, as shown in histogram 400B. Alternatively, referring now to FIG. 4B, which illustrates the exponential decay approach, the online system 140 may reduce the inferred number of individuals 304 presented 315 with the content item five or more times by 54 individuals 304, as shown in histogram 400C. In this example, the online system 140 may increase the inferred number of individuals 304 presented 315 with the content item four times by 27 individuals 304 (i.e., ½ of 54 individuals 304). Continuing with this example, the online system 140 also may increase the inferred number of individuals 304 presented 315 with the content item three times by 14 individuals 304 (i.e., about ¼ of 54 individuals 304) and repeat this process using smaller fractions for each additional impression frequency, such that the inferred total number of presentations of the content item is no longer greater than the known total number of presentations of the content item, as also shown in histogram 400C. In embodiments in which the online system 140 adjusts the inferred number of individuals 304 who performed an action in association with being presented 315 with the content item for a set of the interaction frequencies, the online system 140 may do so using the linear approach or the exponential decay approach in an analogous manner.

Referring back to FIG. 3B, the online system 140 may generate 385 (e.g., using the report generator 260) a report describing the inferred reach/adjusted inferred reach for each impression frequency. The report may include one or more histograms describing the inferred reach of the content item for each impression frequency and/or the inferred number of individuals 304 who performed an action in association with being presented 315 with the content item for each interaction frequency. The online system 140 also may generate 390 (e.g., using the user interface generator 265) a user interface including the report. For example, if the online system 140 generates 385 a report that includes multiple histograms, the online system 140 may generate 390 a user interface that includes each of the histograms. The online system 140 may then send 395 the user interface for display to the content-providing user 302 of the online system 140 from whom the content item was received 300 and/or a user of the online system 140 associated with the content item.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at an online system, information describing each presentation of a content item to each of a plurality of individuals by a plurality of content publishers, the information comprising user-identifying information associated with a set of the plurality of individuals;
   identifying one or more users of the online system from the plurality of individuals based at least in part on a comparison of the user-identifying information to information maintained in the online system describing a plurality of users of the online system;

determining a known total number of presentations of the content item to the plurality of individuals and a frequency with which each of the one or more users were presented with the content item by the plurality of content publishers based at least in part on the information describing each presentation of the content item;

de-biasing information describing one or more attributes of the one or more users who were presented with the content item for each of a plurality of impression frequencies by the plurality of content publishers based at least in part on a set of attributes for the one or more users and a set of corresponding attributes for the plurality of individuals;

training a set of machine-learning models to infer a number of the individuals presented with the content item for each of the plurality of impression frequencies, the set of machine-learning models trained based at least in part on the de-biased information;

inferring the number of individuals presented with the content item for each of the plurality of impression frequencies using the set of machine-learning models;

computing an inferred total number of presentations of the content item based at least in part on the inferred number of individuals presented with the content item for each of the plurality of impression frequencies;

comparing the inferred total number of presentations of the content item to the known total number of presentations of the content item; and responsive to determining that the inferred total number of presentations of the content item is greater than the known total number of presentations of the content item, adjusting the inferred number of individuals presented with the content item for a set of the plurality of impression frequencies.

2. The method of claim 1, wherein adjusting the inferred number of individuals presented with the content item for a set of the plurality of impression frequencies comprises:

reducing the inferred number of individuals presented with the content item for a first impression frequency of the plurality of impression frequencies by a number of individuals; and increasing the inferred number of individuals presented with the content item for a second impression frequency of the plurality of impression frequencies by the number of individuals such that the inferred total number of presentations of the content item is not greater than the known total number of presentations of the content item.

3. The method of claim 2, wherein the second impression frequency corresponds to a lower impression frequency than the first impression frequency.

4. The method of claim 1, wherein adjusting the inferred number of individuals presented with the content item for a set of the plurality of impression frequencies comprises:

reducing the inferred number of individuals presented with the content item for an impression frequency of the plurality of impression frequencies by a number of individuals; and increasing the inferred number of individuals presented with the content item for each of one or more additional impression frequencies of the plurality of impression frequencies by a fraction of the number of individuals such that the inferred total number of presentations of the content item is not greater than the known total number of presentations of the content item.

5. The method of claim 4, wherein the fraction of the number of individuals by which the inferred number of individuals is increased for each of the one or more additional impression frequencies is proportional to each of the one or more additional impression frequencies.

6. The method of claim 1, wherein training the set of machine-learning models to infer the number of the individuals presented with the content item for each of the plurality of impression frequencies is further based at least in part on one or more of: one or more IP addresses associated with one or more of the plurality of individuals, one or more IP address and user agent combinations associated with the one or more of the plurality of individuals, an average number of cookies associated with the one or more users, and an average number of stable cookies associated with the one or more users.

7. The method of claim 1, wherein each of the set of machine-learning models is normalized against each additional machine-learning model comprising the set of machine-learning models.

8. The method of claim 1, further comprising:

generating a report comprising a histogram, the report describing the inferred number of individuals presented with the content item for one or more of the plurality of impression frequencies and the adjusted inferred number of individuals presented with the content item for the set of the plurality of impression frequencies.

9. The method of claim 1, wherein de-biasing information describing the frequency with which each of the one or more users were presented with the content item by the plurality of content publishers is further based at least in part on a randomized de-synching process.

10. The method of claim 1, wherein de-biasing information describing the frequency with which each of the one or more users were presented with the content item by the plurality of content publishers comprises:

using a sampling method to extrapolate one or more attributes for the plurality of individuals based at least in part on the set of attributes for the one or more users and the set of corresponding attributes for the plurality of individuals.

11. The method of claim 10, wherein the sampling method comprises a stratified sampling method or a cluster sampling method.

12. A computer program product comprising a computer readable storage medium having instructions encoded thereon that, when executed by a processor, cause the processor to:

receive, at an online system, information describing each presentation of a content item to each of a plurality of individuals by a plurality of content publishers, the information comprising user-identifying information associated with a set of the plurality of individuals;

identify one or more users of the online system from the plurality of individuals based at least in part on a comparison of the user-identifying information to information maintained in the online system describing a plurality of users of the online system;

determine a known total number of presentations of the content item to the plurality of individuals and a frequency with which each of the one or more users were presented with the content item by the plurality of content publishers based at least in part on the information describing each presentation of the content item;

de-bias information describing one or more attributes of the one or more users who were presented with the content item for each of a plurality of impression frequencies by the plurality of content publishers based at least in part on a set of attributes for the one or more users and a set of corresponding attributes for the plurality of individuals;
train a set of machine-learning models to infer a number of the individuals presented with the content item for each of the plurality of impression frequencies, the set of machine-learning models trained based at least in part on the de-biased information;
infer the number of individuals presented with the content item for each of the plurality of impression frequencies using the set of machine-learning models;
compute an inferred total number of presentations of the content item based at least in part on the inferred number of individuals presented with the content item for each of the plurality of impression frequencies;
compare the inferred total number of presentations of the content item to the known total number of presentations of the content item; and
responsive to determining that the inferred total number of presentations of the content item is greater than the known total number of presentations of the content item, adjust the inferred number of individuals presented with the content item for a set of the plurality of impression frequencies.

13. The computer program product of claim 12, wherein adjust the inferred number of individuals presented with the content item for a set of the plurality of impression frequencies comprises:
reduce the inferred number of individuals presented with the content item for a first impression frequency of the plurality of impression frequencies by a number of individuals; and
increase the inferred number of individuals presented with the content item for a second impression frequency of the plurality of impression frequencies by the number of individuals such that the inferred total number of presentations of the content item is not greater than the known total number of presentations of the content item.

14. The computer program product of claim 13, wherein the second impression frequency corresponds to a lower impression frequency than the first impression frequency.

15. The computer program product of claim 12, wherein adjust the inferred number of individuals presented with the content item for a set of the plurality of impression frequencies comprises:
reduce the inferred number of individuals presented with the content item for an impression frequency of the plurality of impression frequencies by a number of individuals; and
increase the inferred number of individuals presented with the content item for each of one or more additional impression frequencies of the plurality of impression frequencies by a fraction of the number of individuals such that the inferred total number of presentations of the content item is not greater than the known total number of presentations of the content item.

16. The computer program product of claim 15, wherein the fraction of the number of individuals by which the inferred number of individuals is increased for each of the one or more additional impression frequencies is proportional to each of the one or more additional impression frequencies.

17. The computer program product of claim 12, wherein train the set of machine-learning models to infer the number of the individuals presented with the content item for each of the plurality of impression frequencies is further based at least in part on one or more of: one or more IP addresses associated with one or more of the plurality of individuals, one or more IP address and user agent combinations associated with the one or more of the plurality of individuals, an average number of cookies associated with the one or more users, and an average number of stable cookies associated with the one or more users.

18. The computer program product of claim 12, wherein each of the set of machine-learning models is normalized against each additional machine-learning model comprising the set of machine-learning models.

19. The computer program product of claim 12, wherein the computer readable storage medium further has instructions encoded thereon that, when executed by the processor, cause the processor to:
generate a report comprising a histogram, the report describing the inferred number of individuals presented with the content item for one or more of the plurality of impression frequencies and the adjusted inferred number of individuals presented with the content item for the set of the plurality of impression frequencies.

20. The computer program product of claim 12, wherein de-bias information describing the frequency with which each of the one or more users were presented with the content item by the plurality of content publishers is further based at least in part on a randomized de-synching process.

21. The computer program product of claim 12, wherein de-bias information describing the frequency with which each of the one or more users were presented with the content item by the plurality of content publishers comprises:
use a sampling method to extrapolate one or more attributes for the plurality of individuals based at least in part on the set of attributes for the one or more users and the set of corresponding attributes for the plurality of individuals.

22. The computer program product of claim 21, wherein the sampling method comprises a stratified sampling method or a cluster sampling method.

23. A method comprising:
receiving, at an online system, information describing a plurality of presentations of a content item to a plurality of individuals by one or more content publishers, the information comprising user-identifying information associated with a set of the plurality of individuals;
identifying one or more users of the online system from the plurality of individuals based at least in part on the user-identifying information;
determining a known total number of presentations of the content item to the plurality of individuals and a frequency with which each of the one or more users were presented with the content item by the one or more content publishers based at least in part on the information describing each presentation of the content item;
accessing a set of machine-learning models that are trained by:
de-biasing information describing one or more attributes of the one or more users who were presented with the content item for each of a plurality of impression frequencies by the plurality of content publishers based at least in part on a set of attributes for the one or more users and a set of corresponding attributes for the plurality of individuals, and training the set of machine-learning models to infer a number of the individuals presented with the content item for each of a plurality of impression frequencies, the set of machine-learning models trained based at least in part on the de-biased information;

inferring, using the set of machine-learning models, a number of the individuals presented with the content item for each of a plurality of impression frequencies based at least in part on information describing the frequency with which each of the one or more users were presented with the content item by the one or more content publishers.

24. The method of claim 23, wherein de-biasing information describing the frequency with which each of the one or more users were presented with the content item by the plurality of content publishers comprises:

using a sampling method to extrapolate one or more attributes for the plurality of individuals based at least in part on the set of attributes for the one or more users and the set of corresponding attributes for the plurality of individuals, wherein the sampling method comprises a stratified sampling method or a cluster sampling method.

25. The method of claim 23, further comprising:

determining an inferred total number of presentations of the content item based at least in part on the inferred number of individuals presented with the content item for each of the plurality of impression frequencies;

comparing the inferred total number of presentations of the content item to the known total number of presentations of the content item; and responsive to determining that the inferred total number of presentations of the content item is greater than the known total number of presentations of the content item, adjust the inferred number of individuals presented with the content item for a set of the plurality of impression frequencies.

26. The method of claim 1, wherein the de-biasing adjust for differences between the identified one or more users of the online system and the plurality of individuals to whom the content item was presented.

* * * * *